United States Patent [19]

Scales et al.

[11] Patent Number: 5,802,585
[45] Date of Patent: Sep. 1, 1998

[54] BATCHED CHECKING OF SHARED MEMORY ACCESSES

[75] Inventors: Daniel J. Scales; Chandramohan A. Thekkath, both of Palo Alto, Calif.

[73] Assignee: Digital Equipment Corporation, Maynard, Mass.

[21] Appl. No.: 682,341

[22] Filed: Jul. 17, 1996

[51] Int. Cl.$^6$ .................. G06F 12/00; G06F 9/44
[52] U.S. Cl. .................. 711/154; 711/147; 395/709
[58] Field of Search .................. 395/708, 709, 395/705, 706, 671, 672, 474, 478; 711/147, 151, 154

[56] References Cited

U.S. PATENT DOCUMENTS

| | | | |
|---|---|---|---|
| 4,229,790 | 10/1980 | Gilliland et al. | 395/671 |
| 4,511,961 | 4/1985 | Penton | 711/201 |
| 4,539,637 | 9/1985 | DeBruler | 395/684 |
| 4,953,121 | 8/1990 | Muller | 395/588 |
| 5,117,350 | 5/1992 | Parrish et al. | 711/1 |
| 5,193,180 | 3/1993 | Hastings | 395/710 |
| 5,457,789 | 10/1995 | Dietrich, Jr. et al. | 711/100 |
| 5,528,761 | 6/1996 | Ooba et al. | 395/200.67 |
| 5,613,063 | 3/1997 | Eustace et al. | 395/183.14 |
| 5,644,709 | 7/1997 | Austin | 395/185.06 |

OTHER PUBLICATIONS

"Fine-grain Access Control for Distributed Shared Memory," Schoinas et al., Computer Sciences Dept., University of Wisconsin–Madison, ACM ASPLOS VI, Oct. 1994.

Primary Examiner—Tod R. Swann
Assistant Examiner—Conley B. King, Jr.
Attorney, Agent, or Firm—Dirk Brinkman

[57] ABSTRACT

In a distributed shared memory computer system a plurality of workstations are connected to each other by a network. Each workstation includes a processor, a memory having addresses, and an input/output interface connected to each other by a bus. The input/output interfaces connect the workstations to each other by the network. In a software implemented method for batching access checks to shared data stored in the memories, a set of the addresses of the memories are designated virtual shared addresses to store shared data. A portion of the virtual shared addresses is allocated to store a shared data structure as one or more lines accessible by instructions of the programs executing in any of the processors, the size of each line being a predetermined number of bytes. The programs are analyzed to locate a set of instructions of a particular program which access a range of target addresses storing shared data, the range of target addresses being no greater than the size of one line. In response to determining that accesses to the shared data stored at a first and last addresses of the range of target addresses are valid, the set of instructions are executed. If accesses to the shared data stored at the first or last addresses of the range of target addresses are invalid, miss handling is executed before executing the set of instructions.

26 Claims, 14 Drawing Sheets

BATCHED CHECKING OF SHARED MEMORY ACCESSES

FIELD OF THE INVENTION

The present invention relates generally to a distributed computer system, and more particularly to a distributed computer system including a distributed shared memory.

BACKGROUND OF THE INVENTION

Distributed computer systems typically comprise multiple computers connected to each other by a communications network. In some distributed computer systems, the networked computers can concurrently access shared data. Such systems are sometimes known as parallel computers. If a large number of computers are networked, the distributed system is considered to be "massively" parallel. As an advantage, massively parallel computers can solve complex computational problems in a reasonable amount of time.

In such systems, the memories of the computers are collectively known as a distributed shared memory. It is a problem to ensure that the data stored in the distributed shared memory are accessed in a coherent manner. Coherency, in part, means that only one computer can modify any part of the data at any one time, otherwise the state of the data would be nondeterministic.

Some distributed computer systems maintain data coherency using specialized control hardware. The control hardware may require modifications to the components of the system such as the processors, their caches, memories, buses, and the network. In many cases, the individual computers may need to be identical or similar in design, e.g., homogeneous.

As a result, hardware controlled shared memories are generally costly to implement. In addition, such systems may be difficult to scale. Scaling means that the same design can be used to conveniently build smaller or larger systems.

More recently, shared memory distributed systems have been configured using conventional workstations or PCs connected by a conventional network as a heterogeneous distributed system.

In such systems, data access and coherency control are typically provided by software-implemented message passing protocols. The protocols define how fixed size data blocks and coherency control information is communicated over the network. Procedures which activate the protocols can be called by "miss check code." The miss check code is added to the programs by an automated process.

States of the shared data can be maintained in state tables stored in memories of each processor or workstation. Prior to executing an access instruction, e.g., a load or a store instruction, the state table is examined by the miss check code to determine if the access is valid. If the access is valid, then the access instruction can execute, otherwise the protocols define the actions to be taken before the access instruction is executed.

In prior art distributed shared memory systems, the calls to the miss handling code can be inserted into the programs before every access instruction by an automated process known as instrumentation. Instrumentation can be performed on executable images of the programs.

FIG. 1 shows an example miss check code 100 for a program which is to execute on a RISC type of computer. In this implementation, all of the memories of the distributed computers are partitioned so that the addresses of the shared memory are always higher than the addresses of the non-shared memory. In addition, the implementation maintains coherency state information for fixed size quantities of data, for example "lines." Obviously, the fixed size of the lines used by any particular application can be set to be smaller or larger than 64 bytes. Partitioning the addresses of shared memory, and using fixed lines simplifies the miss check code, thereby reducing overhead.

First, in step 101, save the content of any registers that are going to be used by the miss check code 100 on a stack. In step 102, determine the target address of the access instruction, using the offset and base as specified in the operands of the instruction. The access instruction in this example is a store. A store access is valid if the processor modifying the data stored at the target address has exclusive ownership of the data.

In steps 103–104, determine if the target address is in non-shared memory. If this is true, then skip the rest of miss check code 100, restore the registers at 131 and execute the memory access instruction, step 132. In this case, the overhead is about seven instructions.

Otherwise, if the target address is in shared memory, then in step 105, determine the index of the line including the target address. If the size of the line is an integer power of two, for example 64 bytes, the line index can be computed using a simple shift instruction.

As shown in step 106, the line index can be used to reference the corresponding entry of the state table. In the exemplary implementation, each entry in the state table is a byte. Obviously, if the number of different states is small, for example, the states can be indicated with two bits, then the size of the state table can be reduced. However, by making the entries smaller, it becomes more difficult to extract state information, since most computers do not conveniently deal with addressing schemes and data operations which are less than eight bits.

In step 107–108, the table entry is loaded, and in step 109, determine if the state of the line containing the target address is, for example, EXCLUSIVE. If true, then skip the step 120, and restore the registers from the stack in step 131. In this case, the overhead is about thirteen instructions. Otherwise, call the miss handling code to gain exclusive control over the data in step 120.

It is desired to decrease the number of overhead instructions required to perform access checks to improve the performance of a software controlled distributed shared memory.

It is also desired to combine the fetching of data for multiple loads and stores, in order to reduce the average latency for fetching data from remote workstations.

SUMMARY OF THE INVENTION

A software implemented method batches access checks to shared data of a distributed shared memory system. The distributed shared memory system includes a plurality of workstations. Each workstation includes a processor, a memory having addresses, and an input/output interface connected to each other by a bus. The input/output interfaces connect the workstations to each other by a network.

A set of the addresses of the memories are designated as virtual shared addresses to store the shared data. A portion of the virtual shared addresses are allocated to store a shared data structure as one or more lines accessible by instructions of the programs executing in any of the processors, the size of each line being a predetermined number of bytes.

The programs are analyzed to locate a set of instructions of a particular program which access a range of target addresses storing shared data, the range of target addresses being no greater than the size of one line. The set of instructions are instrumented to check for valid data accesses.

In response to determining that accesses to the shared data stored at a first and last addresses of the range of target addresses are valid, the set of instructions are executed. Miss handling code is executed if accesses to the shared data stored at the first or last addresses of the range of target addresses are invalid.

While instrumenting, the flow of a particular program is traced to locate the instructions of the set which access the range of target addresses. The tracing is terminated upon detecting: a subroutine call instruction, a store instruction in a program section which is conditionally executed, a conditional branch instruction which forms a loop, an access outside the range of target addresses, or an access instruction which use a base register which is modified by a variable to determine target addresses.

DETAILED DESCRIPTION OF THE PREFERRED EMBODIMENT

System Overview

Figure 2:
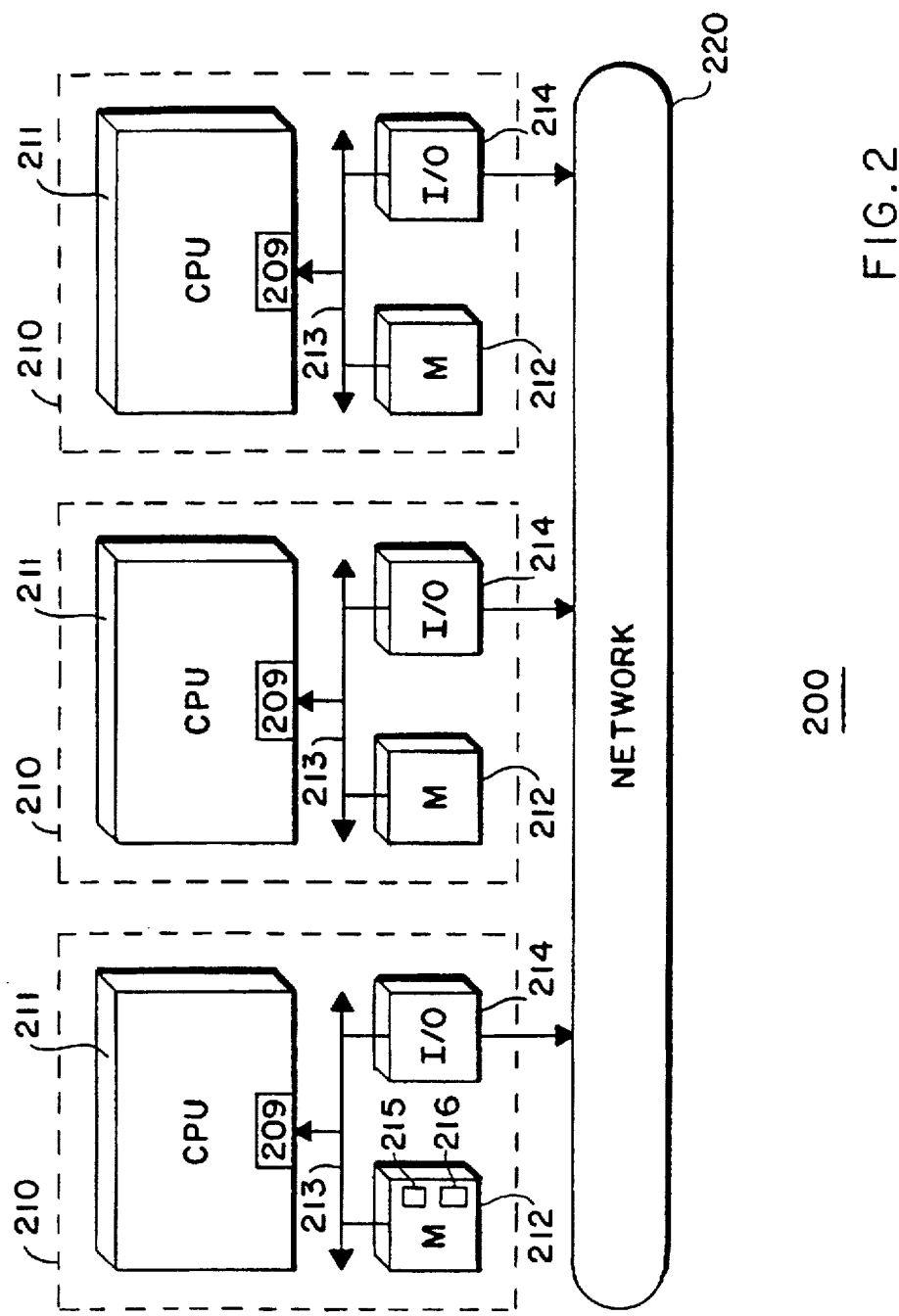
FIG. 2 is a block diagram of a shared memory distributed system of the invention.

FIG. 2 shows a distributed computer system 200 which can use the invention. The system 200 includes a plurality of workstations 210 connected to each other by a network 220. Each workstation 210 can include one or more processors (CPU) 211, memories (M) 212, and input/output interfaces (I/O) 214 connected to each other by a bus 213.

The workstations 210 can include a homogeneous or heterogenous set of processors which may include personal computers. The processors 211 can be CISC or RISC. The processors 211 can include hardware caches 209 to stored frequently accessed data and instructions.

The memories 212 can be dynamic random access memories (DRAM). The memories 212 store programs 215 and data structures 216. Some of the addresses of the memories 212 can be designated as a single set of shared virtual addresses. Some of the data structures can include shared data. Shared data can be accessed by programs executing on any of the processors 211 using the virtual addresses. The buses 213 connect the components of the workstations using data, address, and control lines. The network 220 uses network protocols for communicating messages among the workstations 210, for example, asynchronous transfer mode (ATM), or FDDI protocols.

General System Operation

During operation of the system 200, instructions of the programs 215 are executed by the processors 211. The instructions can access the data structures 216 using load and store instructions. Typically, the accessed data are first stored in the caches 209 and then in processor registers while manipulated by the processors. It is desired that any of the programs 215 executing on any of the processors 211 can access any of the shared data structures 216 stored in any of the memories 212.

Instrumentation

Therefore, as is described herein, the programs 215 are instrumented prior to execution. Instrumentation is a process which locates access instructions (loads and stores) in the programs 215. Once the access instructions have been located, additional instructions, e.g., miss check code, can be inserted into the programs before the access instructions to ensure that the access is performed correctly. The miss check code is optimized to reduce the amount of overhead required to execute the additional instructions.

During the instrumentation, instructions which allocate addresses of portions of the memories 211 are also located in the programs 215 so that coherency control information can be maintained for variable amounts of data, e.g., variable sized blocks.

As stated above, the programs 215 can view some of the addresses of the distributed memories 212 as a shared memory. For a particular target address of the shared memory, an instruction may access a local copy of the data, or a message must be sent to another processor requesting a copy of the data.

Access States

With respect to any processor, the data stored in the shared memory can have any one of three possible states: invalid, shared, or exclusive. In addition, as described below, data states can be in transition, or "pending." If the state is invalid, the processor is not allowed to access the data. If the state is shared, the processor has a copy, and other processors may have a copy as well. If the state is exclusive, the processor has the only valid copy of the data, and no other processors can have valid copies of the data.

The states of the data are maintained by coherency control messages communicated over the network 220. The messages are generated by procedures called by the miss check code of the instrumented programs.

Data can be loaded from the shared memory into a local processor only if the data have a state of shared or exclusive. Data can be stored only if the state is exclusive. Communication is required if a processor attempts to load data that are in an invalid state, or if a processor attempts to store data that are in an invalid or shared stated. These illegal accesses are called misses.

The addresses of the memories 212 can be allocated dynamically to store shared data. Some of the addresses can be statically allocated to store private data only operated on by a local processor. Overhead can be reduced by reserving some of the addresses for private data, since accesses to the private data by the local processor do not need to be checked for misses.

As in a hardware controlled shared memory system, addresses of the memories 212 are partitioned into allocatable blocks. All data within a block are accessed as a coherent unit. As a feature of the system 200, blocks can have variable sizes for different ranges of addresses. To simplify the optimized miss check code described below, the variable sized blocks are further partitioned into fixed-size ranges of addresses called "lines."

State information is maintained in a state table on a per line basis. The size of the line is predetermined at the time that a particular program 215 is instrumented, typically 32, 64 or 128 bytes. A block can include an integer number of lines.

During the operation of the system 200, prior to executing a memory access instruction, the miss check code determines which line of a particular block includes the target address (operand) of the instruction. In addition, the miss check code determines if the target address is in shared memory. If the target address is not in shared memory, the miss check code can immediately complete, since private data can always be accesses by a local processor.

Miss Check Code

Figure 1:
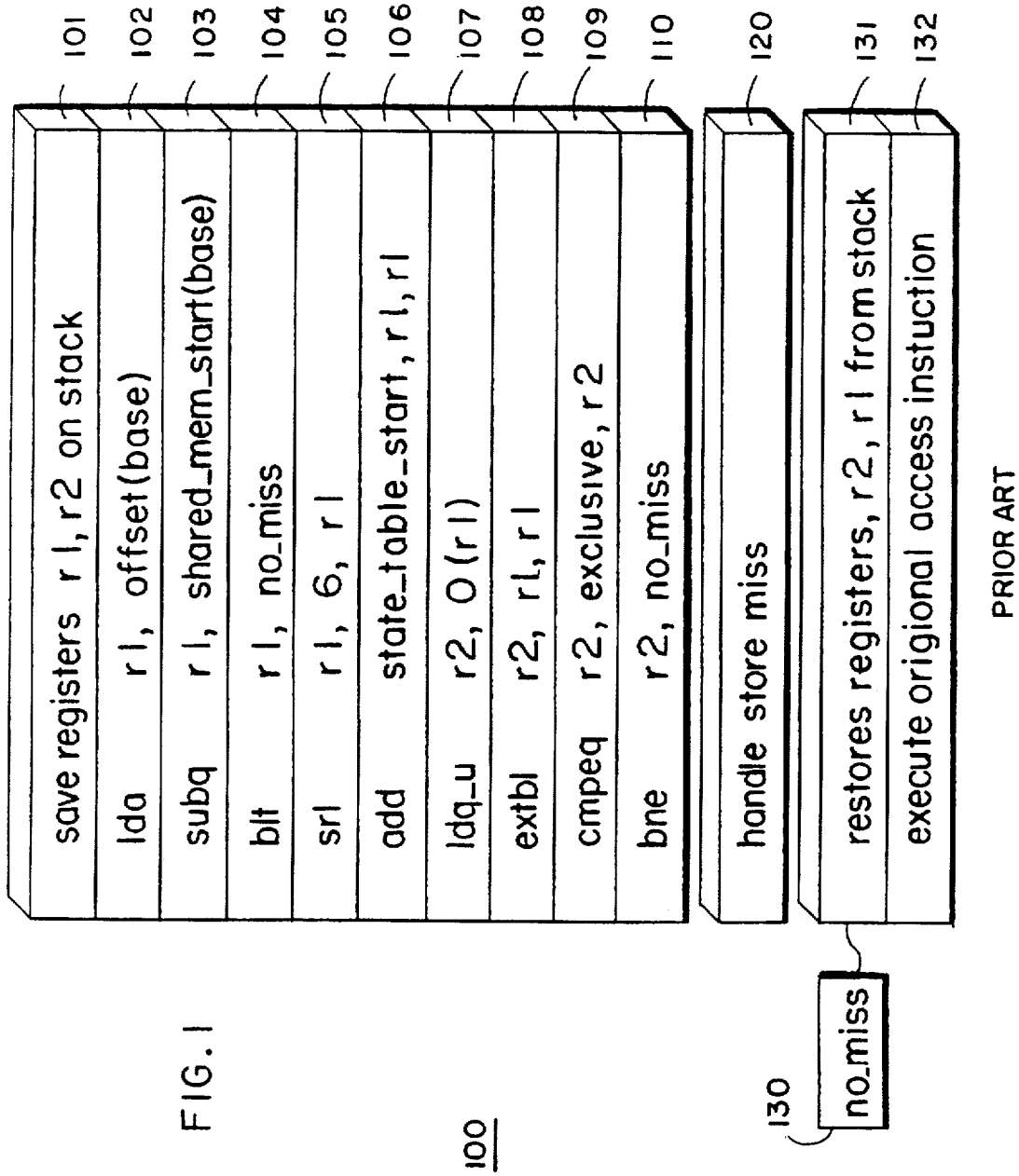
FIG. 1 is an illustration of prior art miss check code for fixed size data blocks.
Figure 3:
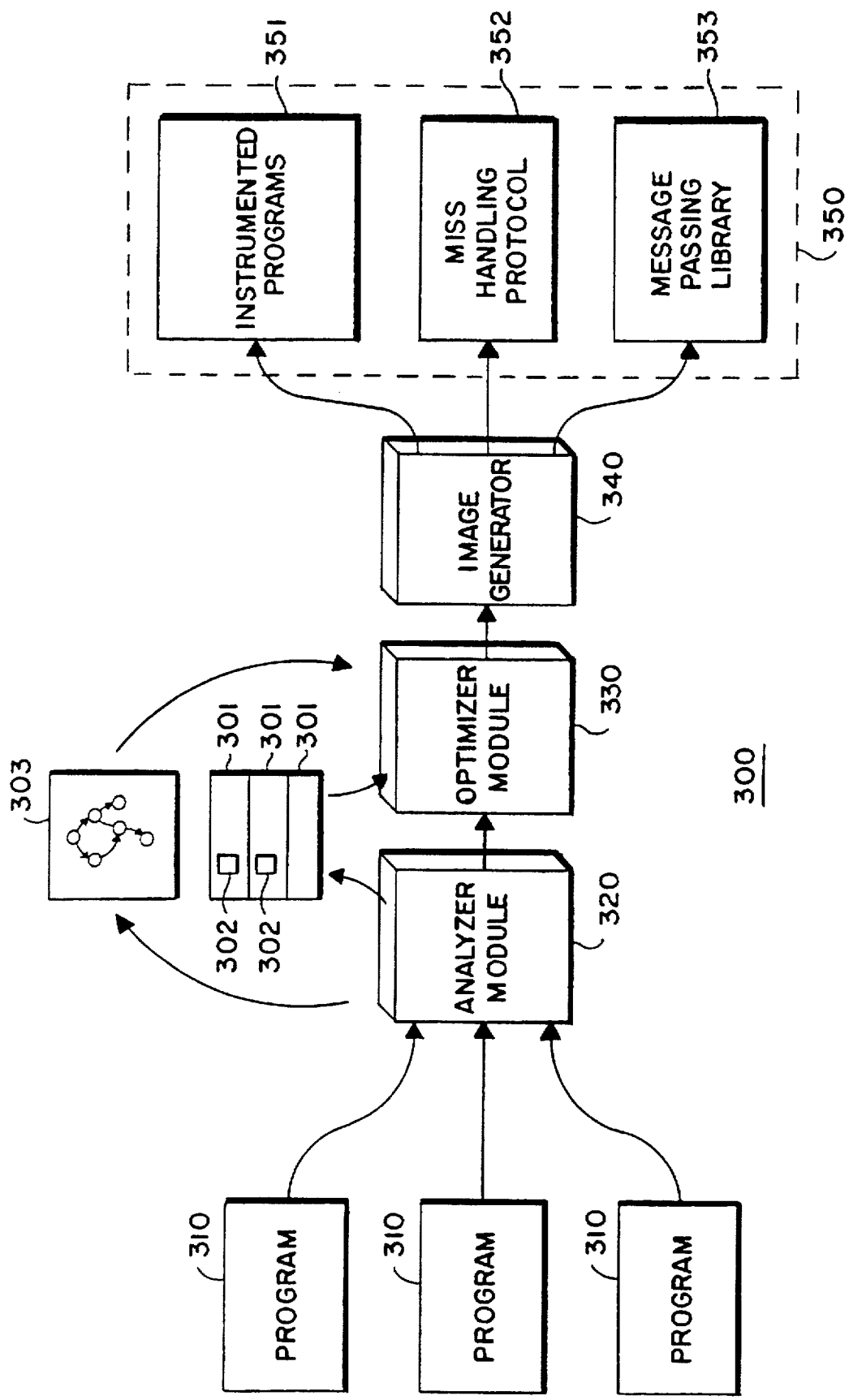
FIG. 3 is a block diagram of the shared memory access controller of the present invention.

FIG. 3 shows a flow diagram of a process 300 which can be used to reduce the amount of overhead required for the miss check code of FIG. 1. In addition, the process 300 admits coherency control for variable sized data quantities. The process 300 includes an analyzer module 320, an optimizer module 330, and an executable image generator 340.

Programs 310 for executing on the system 200 are presented to an analyzer module 320. The analyzer 320 breaks the programs 310 into procedures 301, and the procedures 301 into basic execution blocks 302. A basic block 302 is defined as a set of instructions that are all executed sequentially if the first instruction of the set is executed. The instructions of the procedures and basic blocks are analyzed to form program call and flow graphs 303. The graphs 303 can be used to determine a data and execution flow of the programs 310. The basic blocks and graphs 303 are analyzed to locate instructions which allocate memory addresses and perform accesses to the allocated addresses. If an instruction accesses the memories 212, miss check code is inserted in the program to ensure that the access is performed in a coherent manner.

The miss check code is inserted by the optimizer module 330 as described in further detail below. After the programs 310 have been instrumented, the image generator 340 produces an executable image 350 including instrumented programs 351 with miss check code, miss handling protocol procedures 352, and a message passing library 353.

Figure 4:
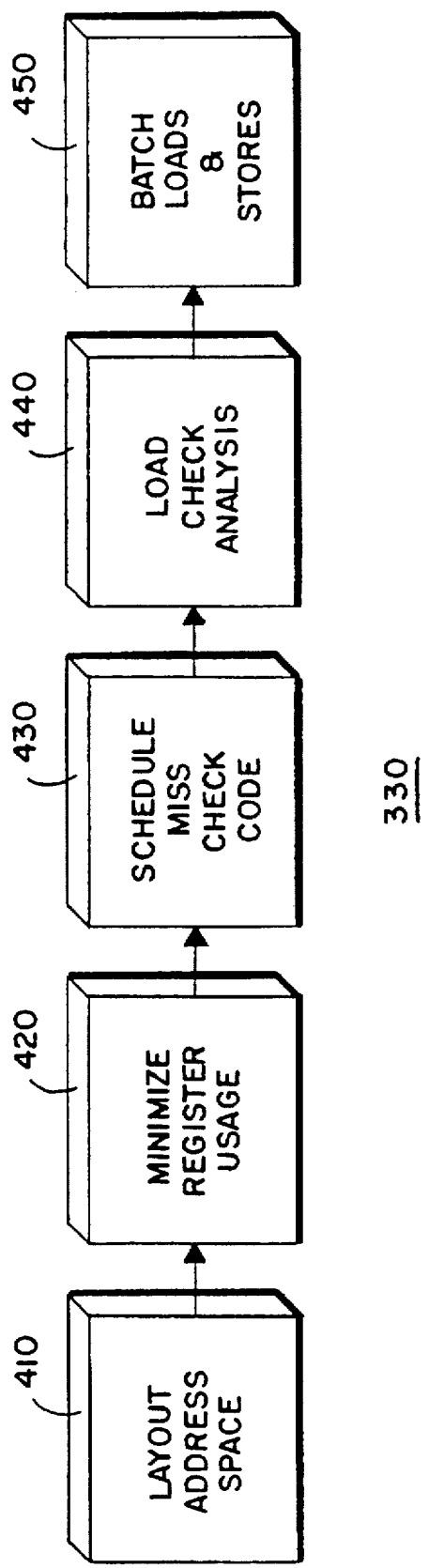
FIG. 4 is a block diagram of optimizing steps of the present invention.

FIG. 4 shows the steps performed by the optimizer module 330 of FIG. 3. These steps include memory partitioning 410, register analyzing 420, code scheduling 430, load check analyzing 440, and batching 450 steps.

Memory Layout

Figure 5:
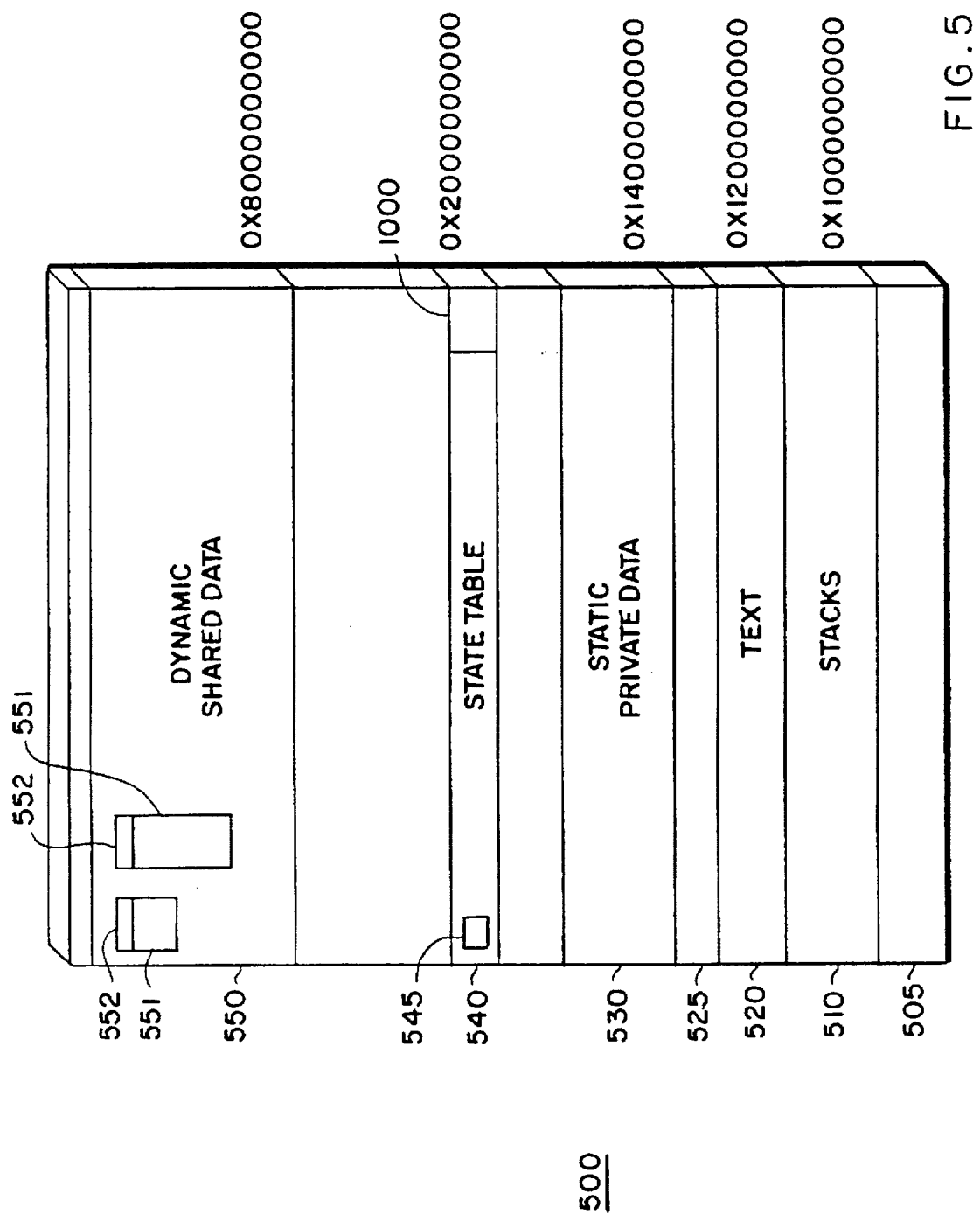
FIG. 5 is block diagram of a memory partitioning of the present invention.

FIG. 5 shows an allocation of addresses to the memories 212 of FIG. 2. Addresses are increasing from the bottom of FIG. 5 to the top. Addresses are reserved for stacks 510, program text 520, statically allocated private data 530, a state table 540, and dynamically allocated shared data 550.

During operation, addresses used by the stacks 510 decrease towards the stack overflow area 505. The text space 520 is used for storing the executable instructions, e.g., the image 350 of FIG. 3. The addresses assigned for text increase towards the text overflow area 525.

The addresses of the private data section 530 are used to store data structures which are exclusively used by a single local processor, e.g., the data are not shared. The addresses in this portion of memory are statically allocated when a particular program is loaded for execution.

State Table

The state table 540 includes a one byte entry 545 for each line of allocated addresses. The bits of the entry 545 can be used to indicate the various states of the corresponding line of data. A portion of the state table data section can be set aside for an exclusion table 1000 described in greater detail below.

The addresses of the shared data 550 are dynamically allocated by the programs while executing. As an advantage, the addresses of the shared data 550 can be allocated in variable sized blocks 551. The blocks are further partitioned into lines 552.

With the layout as shown in FIG. 5, not all access instructions need to be instrumented. For example, data stored in the program stacks 510 are not shared. Therefore, any instructions which use the stack pointer register (SP) as a base, do not need miss check code applied. Also, any instructions which access private data 530, using a private data pointer register (PR) do not need to be instrumented.

Register Usage

The analyzer module 320 of FIG. 3 uses the graphs 303 and dataflow analysis to track the content of general purpose registers to determine whether values stored in the registers were derived from addresses based on the SP or PR registers. Then, an instruction accessing the stack or private data via a derived address do not need to be instrumented. The analyzer 320 can also locate any registers which are free at the time that the miss check code needs to be applied, which eliminates the need to save and restore the registers used by the miss check code.

In the miss check code of FIG. 1, the constant values "shared_mem_start" and "state _table_start" of instructions 103 and 106 are produced in-line, using perhaps several instructions, or else the values are stored in a reserved register. With the memory layout as shown in FIG. 5, the need for the constant values can be eliminated. If the start of the shared memory addresses of the global address space 550 is made, for example, 0x8000000000, it is possible to check to see if an access is to shared memory 550 with a simple shift instruction.

By starting the state table 540 at address 0x2000000000, a shift of the target access address can directly produce the address of the corresponding entry 545 in the state table 540. Although the layout of the addresses shown in FIG. 5 is for a processor with 64 bit addressing capabilities, it should be understood that the layout 500 can be modified for processors having 32 bit, and other addressing capabilities.

Optimized Miss Check Code

Figure 6:
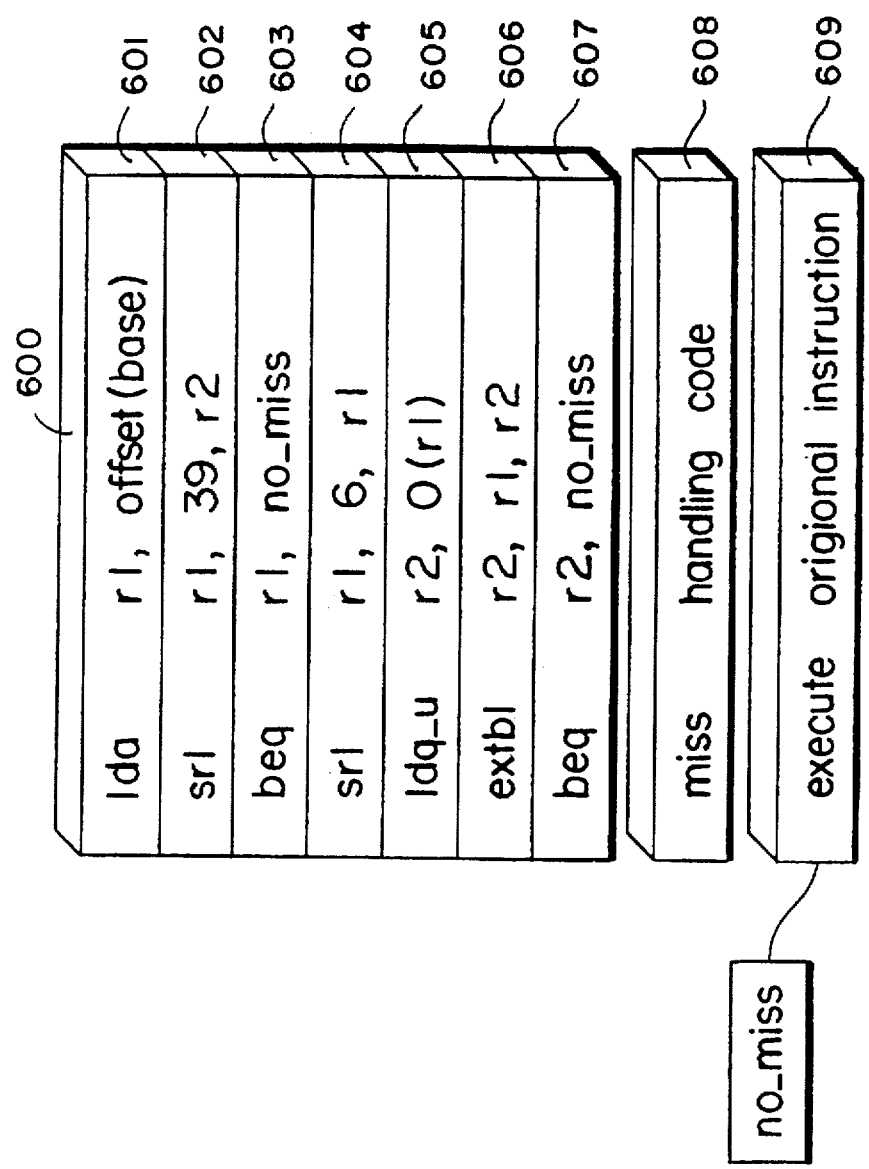
FIG. 6 is a diagram of optimized store miss check code of the present invention.

FIG. 6 shows miss check code 600 optimized for the memory layout of FIG. 5. Note, instructions for saving and restoring registers, as used by the miss check code as shown in FIG. 1, are no longer needed since the miss check code 600 can use free registers. With a careful analysis, free registers can be located in almost all cases.

The target address for an access can be determined by instruction 601. However, if the target base address has already been established in a register by, for example, a previously executed load or store instruction, then the instruction 601 which loads the targeted base address is not required.

The shift instruction 602 calculates the target address which is tested in step 603. The shift instruction 604 produces the address of the entry in the state table corresponding to the line including the target address. By making the value of the state "EXCLUSIVE" be a zero, the need for a constant value as in instruction 109 of FIG. 1 is eliminated. Instead, a simple branch instruction 607 can be performed to check for a miss. Instructions 605–606 retrieve the state table entry. The miss handling code 608 is executed in the case of a miss, and the original store instruction is executed at 609.

The miss check code 600 only requires three instructions in the case of a private data access compared with seven of the code 100. In the case of a shared data access, the code 600 requires seven instructions compared with thirteen of the code 100.

Code Scheduling

In step 430 of FIG. 4, instruction scheduling techniques can be used to further reduce the amount of overhead used by the miss check code 600. In modern processors that are pipelined and superscalar, the added miss check code can, in many cases, be arranged to introduce minimal pipeline delays, and maximum potential for multiple instructions being issued during a single processor cycle.

Figure 7:
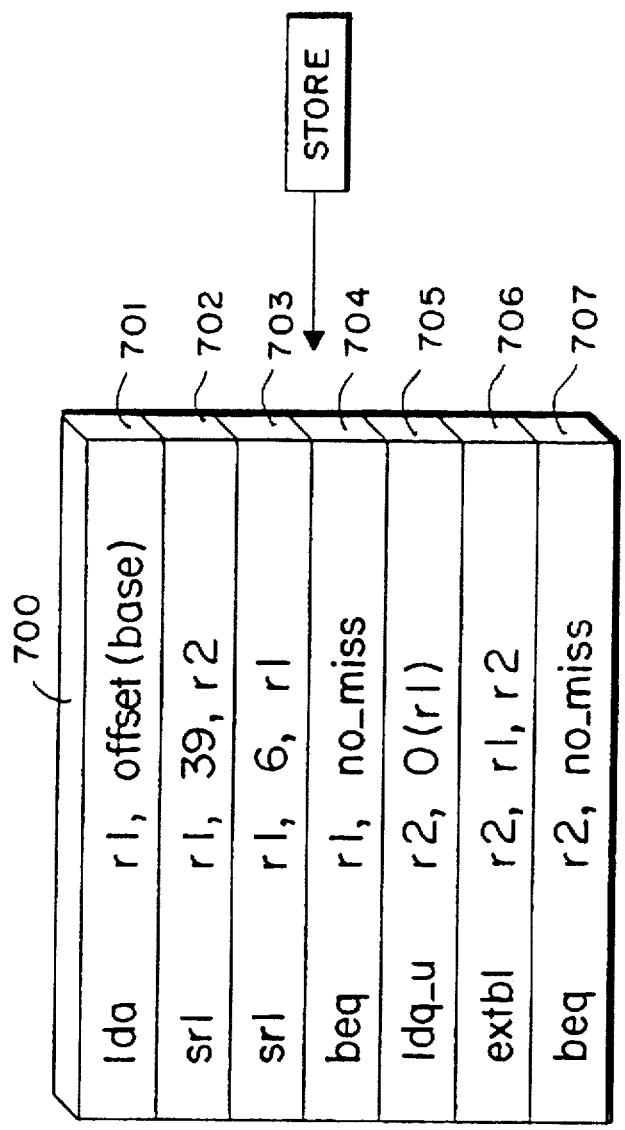
FIG. 7 is a diagram of miss check code of the present invention arranged for optimal scheduling.

For example, in some processors, there is a one cycle delay before the result of a shift operation can be used. Therefore, if the second shift instruction 604 of FIG. 6 is advanced to occupy the delay slot which results from the first shift instruction 702, as shown in FIG. 7, then the stall between the relocated second shift 703 and the ldq_u instruction 705 is eliminated. This means that the code 700 can complete in fewer machine cycles than the code 600. Note, as for code 600, the need for instruction 701 can be eliminated in many cases. Instructions 705–707 load and check the data state.

The overhead of the miss check code can further be reduced by advancing the instructions of the miss check code to points before the access instruction when there are available delay slots due to unavoidable pipeline stalls in the executable code. Advancing instructions into delay slots essentially eliminates the overhead associated with executing the miss check instructions.

To further reduce overhead in a multiple issue processor, the instructions of the miss check code 700 can be placed so that they are issued concurrently with the instructions of the executable image. Note, the execution of the first three instructions 701–703 can be advanced in a basic block of instructions as long as the registers (r1 and r2) remain free. In fact, in many cases all three instructions can be advanced sufficiently to completely hide the additional overhead of executing the instructions. Therefore, it clearly is beneficial to arrange the code as shown in FIG. 7.

Store Check

The miss check code can further be optimized when the access instruction is a store instruction 710. In this case, the first three instructions 701–703 are placed before the store instruction 710. The remaining instructions 704–707 are placed after the store instruction 710. This placement is advantageous in the cases where there may be longlatency instructions immediately preceding the store instruction 710 while the program is computing the value to be stored. In this case, the store instruction 710 must stall until the value becomes available. Therefore, the overhead associated with executing the advanced instructions may be completely hidden.

Load Check

Figure 8:
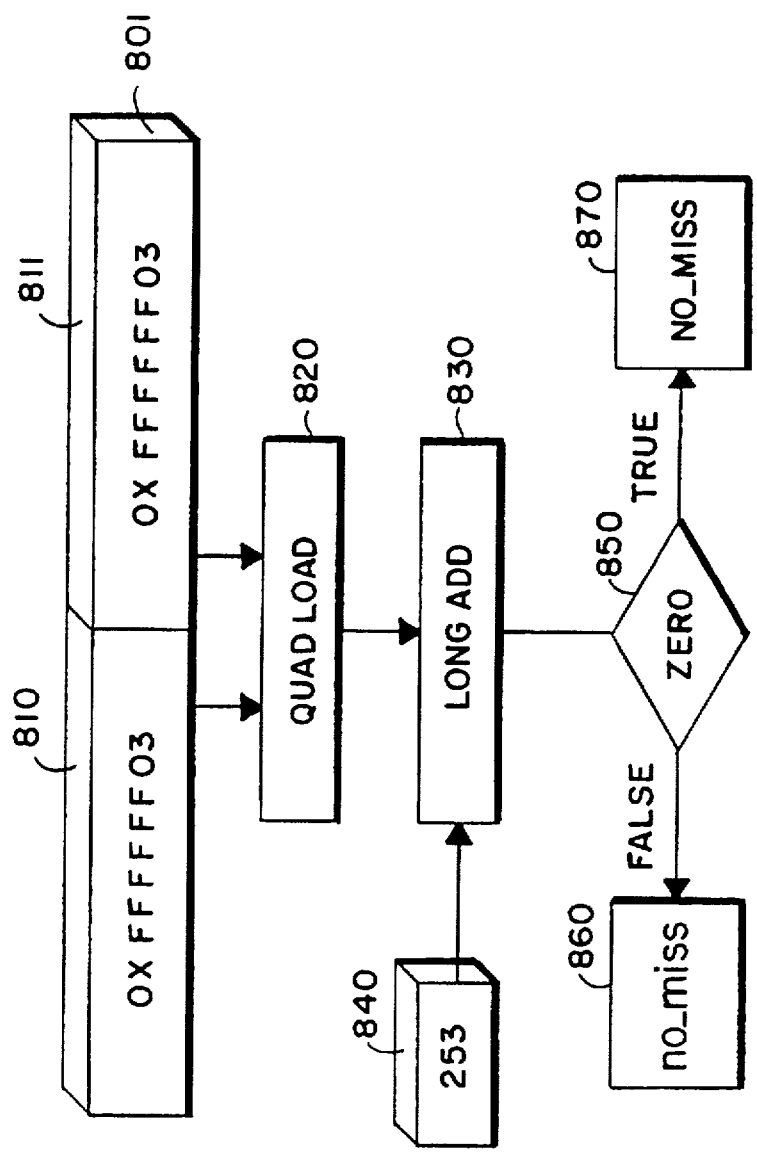
FIG. 8 is a flow diagram illustrating the validation step of the method of the present invention.
Figure 9:
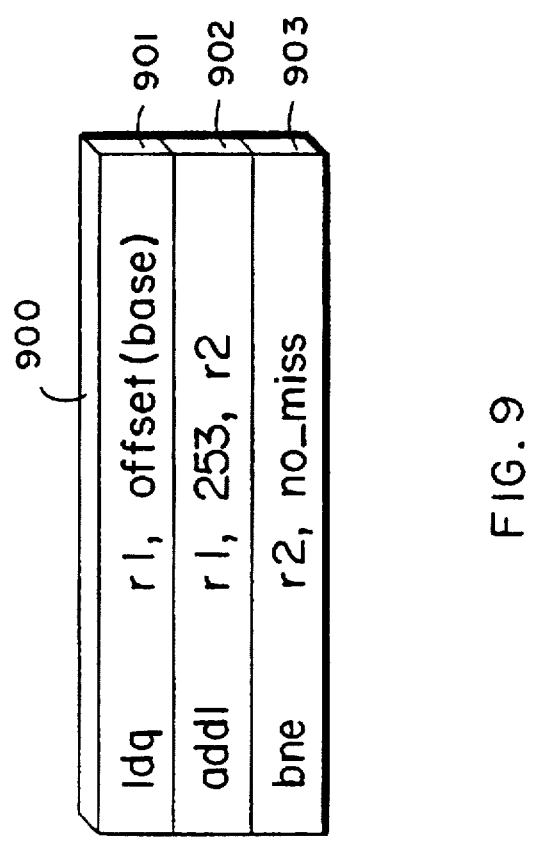
FIG. 9 is a diagram illustrating an invalid flag of the present invention.

As shown in FIGS. 8 and 9, the data loaded by a load instruction can be analyzed to further reduce the overhead of the miss check code. Whenever data of a line become invalid, a "flag" 801 is stored at all of the addresses 810–811 associated with the line. The flag 801 is, for example, 0×FFFFFF03. Then, instead of determining the state of a line via the state table entries, the state can, in almost all cases, be determined from the data loaded.

For example, the data at target addresses are accessed with a load instruction 901, step 820. In step 830, add the complement 840 of the flag, e.g., 253. In step 850, check to see if the data loaded from memory likely indicates an invalid state. If true, proceed with the miss code 870, otherwise continue with step 860, no-miss. In the case where there is a presumed miss, the miss code 870 can confirm by checking the entry for the line in the state table 540. This takes care of the rare case where the program actually uses data equal to the flag.

The flag is chosen so that a single instruction 902 can be used to check for invalid data. It is possible that almost any constant could be used. Note, if a zero value is used to indicate an invalid condition, then a simple branch instruction would suffice. However, in cases where a zero or other small integer, e.g., −1, 0, +1, is used, the measured overhead of the miss check code seems to increase due to dealing with a larger number of false misses. In actual practice when using the flag 0×FFFFFF03, false misses rarely occur, therefore, the optimized miss check code 900 as shown in FIG. 9 greatly reduces the miss check code for a load instruction, e.g., two instructions compared with thirteen of FIG. 1, if the data stored at the target address have already been loaded into a register.

Besides reducing the overhead, the flag technique also has other advantages. The main advantage is that the need to examine the state table is eliminated in cases where the load access is valid. Also, the flag makes the load of data from the target address and the state check atomic. This atomicity will simplify any implementation where programs may be subject to process interruptions.

The flag technique can also be used for floating point load access instructions. In this case, the miss check code loads the data of the target address into a floating point register, followed by a floating point add and compare. However, on some processors floating point instructions may have long associated delays. Therefore, floating point miss code can be optimized by inserting an integer load for the same target address, and implementing the flag checking as described above for FIGS. 8 and 9. Even with the additional load instruction, this technique is still more efficient than checking an entry of the state table.

It should be understood that instruction scheduling can be applied to the instructions of FIG. 9 for load miss code checks. In a preferred implementation, the scheduling step 430 of FIG. 4 attempts to delay the execution of instructions 902 and 903 to avoid a pipeline stall when the value of the load is to be used.

Cache Misses

When loading entries from the state table 540, misses in the hardware cache 209 of FIG. 2 can be one potential source of increased overhead for the miss check code. If the program has good spatial locality, then the program will not experience many hardware cache misses. If 64 byte lines are used, then the memory required for the state table is only 1/64th of the memory of the corresponding lines. However, if the program does not have good spatial locality, then cache misses on the data, as well as misses on the state table, are more likely.

Exclusion Table

Figure 10:
FIG. 10 is a block diagram of an exclusion table of the present invention.

As shown in FIG. 10, the state table 540 can include a separate portion designated an exclusion table 1000. The purpose of the exclusion table 1000 is to reduce hardware cache misses caused by the miss check code loading state table entries for store instructions. The exclusion table 1000 has bit entries 1010, one bit for each corresponding line. A bit is set to a logical one if the corresponding line has the exclusive state, otherwise the bit is set to a logical zero. Before checking the entries 545 of the state table 540, the store miss check code can examine the bits 1010 of the exclusion table 1000 to determine whether a corresponding line has the exclusive state. If the line does have the exclusive state, then the store can execute immediately.

For sixty-four byte lines, the memory used by the exclusion table 1000 is 1/512 of the amount of memory used by the lines. Therefore, the number of hardware cache misses caused by store miss check code using the exclusion table 1000 can be one eighth of the hardware cache misses that would occur just using the state table 540. Note, the use of the exclusion table 1000 for store miss code checks is enabled, in part, by the invalid flag 801 of FIG. 8. The load miss check code for loads does not have to access the state table in the case where the data are valid. Hence, the exclusion table 1000 is only accessed by the miss check code for store instructions.

Batching

The batch optimizing step 450 of FIG. 4 recognizes that loads and stores of data are frequently executed in batches relative to a common base register and offsets. For example, in programs, it is frequently the case that data are accessed and manipulated in a sequential order according to their addresses. The batch optimizing step 450 detects a set of instructions which access a range of target addresses no greater than the size of one line, e.g., the range is 64 bytes or less. Such a set of load and store instructions can at most access data in two immediately adjacent lines, and in some cases only a single line.

In this case, the miss check code determines if the two lines are in a correct state. If this is true, then all of the load and/or store instructions in the set can be performed without requiring any additional checks. It should be understood that a batch check can also be performed for a range of target addresses which span a single line. However the code which checks for two adjacent lines can check for a single line without a substantial increase in overhead.

As one constraint, the batched load and store instructions cannot be intermingled with other loads and stores which have separate miss check code. Misses induced by other loads and stores may change the state of a line to yield an improper result for the batched load and share instructions. However, loads and stores via multiple base registers can be batched as long as proper miss checks are done for the respective lines referenced via the corresponding base registers.

As another constraint, the base register used by the batch of instructions cannot be modified by a variable while the batch is accessing target addresses in the checked range. This would invalidate the initial check for the batch. It is possible to modify the base register by a constant, since in this case the range check can statically be performed prior to executing the batched access instructions.

The batching technique is always successful in reducing miss check code overhead. However, the technique is especially useful for instructions of a loop which has been "unrolled." An unrolled loop includes instructions which are executed linearly instead of in an iterative circular fashion. Here, access instructions typically work within a small range of a base register that is not modified during the iterations. In this case, the batching technique can nearly always be applied, and is very effective.

Although batching is always attempted for instructions of a single basic block, it may also be possible to perform batching for load and store instructions which span several basic blocks. When loads and stores across several basic blocks are batched, there are additional constraints. The batched set of instructions cannot include any subroutine calls, since these calls may cause the execution of loads and stores having unknown target addresses in the called subroutines. Also, the batched instructions cannot include a loop, since the number of times the loop is repeated cannot be determined until the instructions of the batch are executed. Furthermore, in a batch including conditional branches, a store which occurs in one of the branched execution paths must occur in all paths. Only then can it be determined which store accesses have been performed when the batched instructions are executed.

The batching process can arbitrarily batch many loads and stores relative to any number of base registers, and across one or more basic blocks.

A "greedy" batching algorithm can be used. The greedy algorithm locates as many load and store instructions as possible to include in a batch. The algorithm completes when a terminating condition, as described below, is reached. If there is only a single load or store instruction in a batch, batched miss check code is not used.

If a conditional branch instruction is encountered which results in two possible execution paths, both paths are examined for instructions to include in a batch. The scanning of the two separate execution paths is merged when the execution of the two paths merge.

Terminating conditions can include: a load or store instruction which uses a base register which is modified by a variable; a load or store instruction which has a target address outside the lines being checked; a subroutine call; a conditional branch instruction which causes a loop, e.g., a re-execution of one or more instructions; the end of a subroutine is reached; a store instructions in one of several branches; and the scanning of one branch which merges with a parallel branch, but scanning of the parallel branch has already terminated.

Miss Check Code for Batches of Instructions

Figure 11:
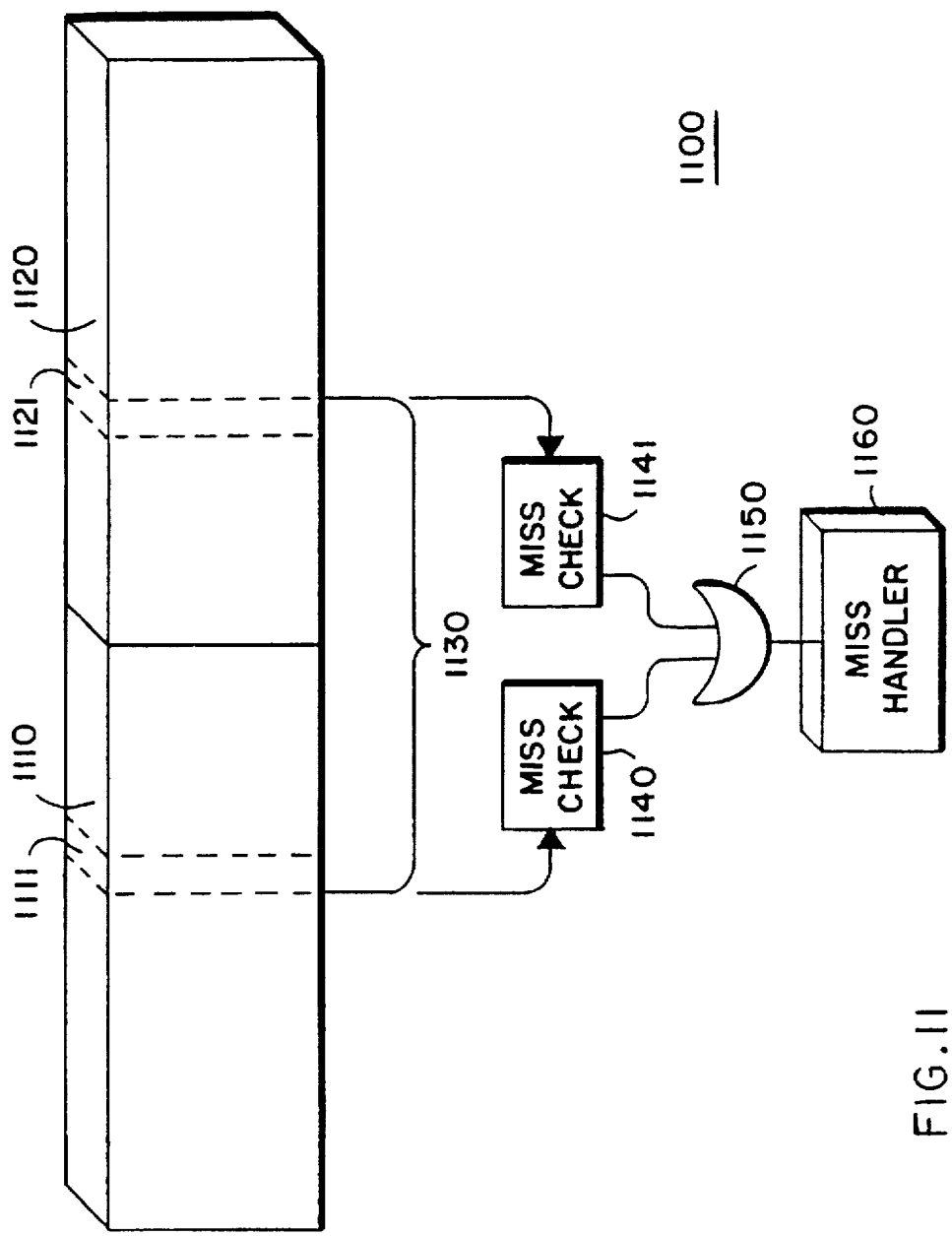
FIG. 11 is a block diagram illustrating batch checking of the present invention.
Figure 12:
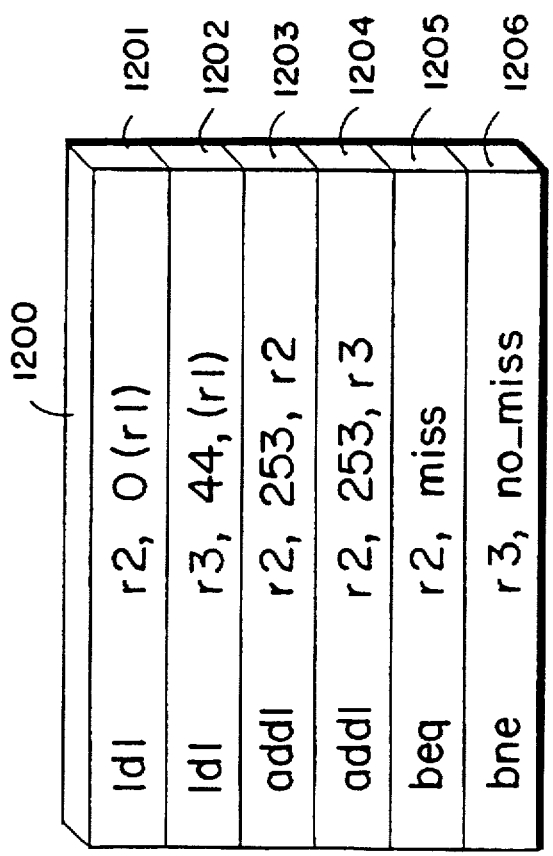
FIG. 12 is a diagram illustrating instructions of the present invention arranged for optimal scheduling.

FIGS. 11 and 12 respectively show the flow 1100 and miss check code 1200 for a group of batched load instructions which access a range of target addresses 1130. One convenient way to check the range 1130 is to perform miss code checking 1140-1141 on the first address 1111 and the last address 1121 of the range 1130 of addresses accessed by the set of access instructions. The first and last addresses must respectively be in the first and last lines 1110 and 1120, see instructions 1201-1204. The instructions 1205 and 1206 check for the invalid flag.

If either address 1111 or 1121 are invalid (1150), then the miss handling code 1160 is called. If both the first and the last addresses store valid data, all of the instructions of the set can be executed without any further checking. As an advantage, the miss check code 1200 for the endpoint addresses can be interleaved with each other to effectively eliminate pipeline stalls.

Message Passing Library

The message passing library 353 of FIG. 3 provides the necessary procedures to allow the workstations 210 to communicate over the network 220. For example, if the network 220 uses ATM protocols, the routines of the library 353 communicates ATM type of messages. The routines of the library 353 can send and receive messages of an arbitrary size. In addition, the routines can periodically check for incoming messages.

Miss Handling Protocol

The other code which is linked to the instrumented program 351 of FIG. 3 is the miss handling protocol code 352. This code can fetch data from the memory of another workstation, maintain coherence among shared copies of data, and ensure that a workstation which is attempting to store data has exclusive ownership of the data.

The protocol code 352 also implements synchronization operations such as "locks" and barriers." The code 352 is called whenever the miss check code detects a load or store miss, or when a synchronization operation is required.

The protocol code 352 is a directory-based invalidation protocol. For each block 551 of shared data 550 of FIG. 5, one of the workstations is assigned to be the "home" workstation. Blocks can be assigned to different home workstations in a round-robin manner, e.g., in turn of allocation. Blocks can be explicitly assigned to a particular workstation if placement hints are supplied by a one of the programs 310 of FIG. 3.

A home workstation is responsible for initializing the data stored at addresses of the block. For example, the bytes of the allocated blocks can be initialized to the invalid flag 0xFFFFFF03. The home workstation can also establishes the initial states of the lines of the allocated block, for example the state can reflect an exclusive ownership. The home workstation also creates the initial directory information about the block.

The directory also indicates, as described below, which workstations have a copy of a block assigned to the home workstation. When a workstation, other than the home workstation, desires to access data of the block, it sends a message to the home workstation indicating that it either wants to load or store data of the block. In the case of a store, an ownership request is also sent.

Home Workstation Directory

Figure 13:
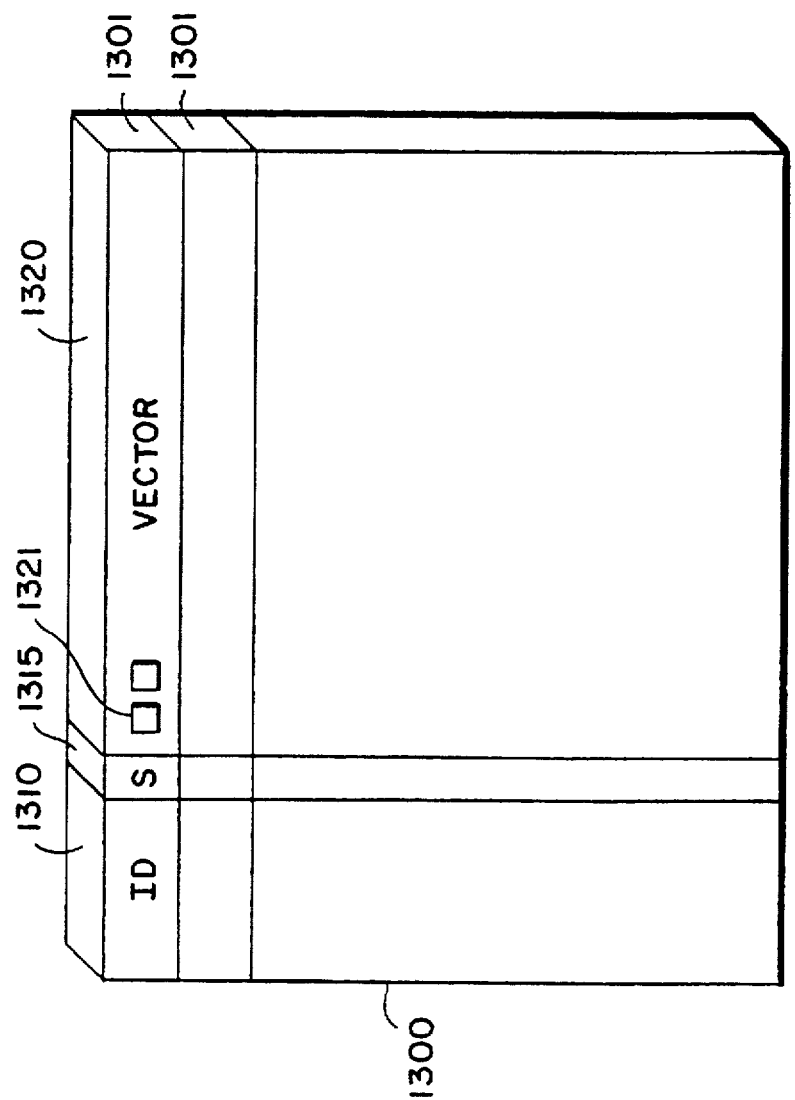
FIG. 13 is a block diagram of a block directory of the present invention.

As shown in FIG. 13, each workstation 210 maintains a directory 1300 which can store information about blocks for which the workstation is the home. Also, at any one time, each line of a particular block is associated with a "controlling" workstation. The workstation which controls a line can be the workstation that last had exclusive ownership over the line.

For each block owned by a home workstation, the directory 1300 has a line entry 1301. Each line entry 1301 includes an identification (ID) 1310, a block size 1315, and a bit vector 1320. The ID 1310 indicates which processor currently controls the block, and the vector 1320 has one bit 1321 for each workstation which has a copy of the block. The block size 1315, as described in further detail below, can be variable-grained.

Protocol Messages

The workstations 210 communicate messages with each other via the network 220 of FIG. 2. The messages are of the following general types. Request messages can request copies of data for the purpose of loading and storing, and reply messages can include the requested data. Requests for data are typically sent to the home workstation. If the home workstation does not have a copy of the data, then the request is forwarded to the controlling workstation. The controlling workstation can reply directly to the workstation which issued the request.

Some messages are also used for process synchronization. Two types of synchronization mechanisms can be used. First, processes can be synchronized to a specified "barrier" address. When synchronizing on a barrier address, workstations having reached the barrier address wait until all other workstations have also reached the barrier address.

Another type of synchronization is via a lock. A "lock" can be exercised by any workstation on a specified address of the shared memory. Another workstation cannot exercise a lock on the same address until the lock is released.

The details of the messages supported by the miss handling code 352 are as follows.

Read Message

A read message requests data for a specified workstation. The read message includes the address of the block which stores the requested data and an identity of the requesting workstation. In response to the message, the entire block including the requested data is fetched.

Write Message

The write message includes the address of the requested data, and an identity of the requesting workstation. This message requests a block of data for the purpose of storing new data in the block when the requesting workstation does not have a copy of the data. Therefore, the message also requests ownership of the block of data.

Ownership Message

This message requests ownership of data controlled by another workstation in the case where the requesting workstation does have a copy of the data. This message is used if the requesting workstation decides to modify its copy of the data. The ownership message includes the address of the data, and an identity of the requesting workstation.

Clean Message

This message is used to communicate a request for a (clean) read-only copy of the data. The clean message includes the address of the requested data, the number of bytes, and an identity of the requesting workstation. As an optimization, the request does not have to be forwarded to another workstation if the home processor has a copy of the requested data.

Forward Message

This message requests that a writable copy of the data be forwarded from the workstation currently controlling the data to the workstation which made a request for the data. The forward message includes the address of the requested data, the number of bytes, and an identity of the requesting workstation.

Invalidate Message

This message requests that a copy of the data be invalidated. When the invalidation has been completed, an acknowledgement is sent to the requesting workstation. The invalidate message includes the address of the requested data, the number of bytes to be invalidated, and an identity of the requesting workstation.

Clean Reply Message

This message includes a copy of the actual data requested in the clean message. The clean reply message includes the address of the requested data, the number of bytes, and the data.

Forward Reply Message

This message includes a writable copy of the requested data. The forward reply message includes the address of the requested data, the number of bytes, and the data.

Invalidate Reply Message

This message is an acknowledgement that the data were invalidated. The invalidate reply message includes the address of the requested data, and the number of bytes to be invalidated.

Barrier Wait Message

This message requests notification to the requesting workstation when all workstations have reached a specified barrier address. The barrier wait message includes the barrier address, and an identity of the requesting workstation.

Barrier Done Message

This message indicates that the conditions of the barrier wait message have been satisfied. The barrier done message includes the barrier address.

Lock Message

This message requests ownership of a lock. In the present implementation the lock is exercised on a specified address of the shared memory. The data stored at the address is of no concern with respect to the lock message. The lock message includes the address associated with the lock.

Lock Forward Message

This message forwards a lock request to a workstation currently controlling the locked address. The lock forward message includes the lock address.

Lock Reply Message

This message transfers control for the locked address to the requesting workstation. The lock reply message includes the locked address.

Dirty Data

The protocol messages described above allow the sharing of "dirty" data. This means that the home workstation of a line is not required to have a clean, up-to-date copy of data. For example, another workstation could have modified its copy of the data, and subsequently shared the modified copy of the data with workstations other than the home workstation. This feature makes the need for write-backs to the home workstation optional. Otherwise, a write-back to the home workstation is required whenever a processor reads a copy of dirty data from another workstation.

Polling

A polling mechanism is used to process the messages generated by the workstations. For example, the network 220 is polled for an incoming message every time there is a miss, and repeatedly when a workstation is waiting for a response to a request message. This avoids a deadlock situation.

In addition, in order to ensure reasonable response times for requests, the programs are instrumented to poll for incoming messages whenever the programs make a function call. If the network 220 is of the type which has short latencies, polling can be on a more frequent basis, such as on every program control back-edge. A program control back-edge can be a branch type of instruction which causes a loop to be iteratively re-executed. Therefore, back-edge polling is done for each iteration of a loop.

Messages could be serviced using an interrupt mechanism. However, servicing an interrupt usually takes longer to process, since the state which exists at the time of the interrupt must first be saved and subsequently be restored. Polling also has the advantage that the task of implementing atomic protocol actions is simplified.

Because of the relatively high overhead associated with sending messages between workstations, extraneous protocol coherence messages are minimized. Because a home workstation of a block guarantees the servicing of the request by forwarding the request to the currently controlling workstation, all messages which change information in the directory 1300 can be completed when the messages reach the home workstation. Thus, there is no need to send an extra message to confirm that a forwarded request has been satisfied. In addition, all invalidation acknowledgements generated in response to exclusive requests are directly communicated to the requesting node, instead of via the home node.

Lock-up Free Cache

The protocol 352 also provides a release consistency model which is substantially equivalent to a hardware type of lock-up free cache which allows non-blocking loads and stores. Data that are "cached" in the distributed shared memories can have any one of the following states: invalid, shared, exclusive, pending-invalid, or pending-shared. The pending states are transitory states of a line when a request for the block including the line is outstanding. The pending-invalid state exists for data having an outstanding read or write request. The pending-shared state exists for data with an outstanding ownership request.

Non-blocking stores are supported by having a workstation continue processing instructions after a request for data has been made. While the request is outstanding, the protocol notes the addresses of any data that are modified in the local copy of the block. Then, when the requested block of data becomes available, the modified data can be merged with the requested data. It should be noted that the batching of loads and stores described above enables non-blocking loads since the batching of loads can lead to multiple outstanding loads for a single check.

Lock-up free behavior can also be supported for data that have a pending state. Storing data at addresses of pending data can be allowed to proceed by noting the addresses where the data are stored, and passing the addresses to the miss handing code 352 of FIG. 3.

Loads from addresses of data having a pending-shared state are allowed to proceed immediately, since the workstation already has a copy of the data. Loads from addresses of data of a block having the pending-invalid state can also proceed, as long as the loads are from addresses of a line of the block that stores valid data. Valid loads to pending lines proceed quickly because of the use of the invalid flag 801 of FIG. 8. A valid load to a pending line can proceeds immediately because the loaded valve is not equal to the invalid flag.

Variable Granularities

As a feature of the protocols as described herein, variable granularities for coherency and message passage are possible, even within a single program, or a single data structure. Variable granularities are possible because all checks for misses are performed by software instructions accessing data at very small granularities, e.g., bytes, long words, and quadwords. In contrast, other distributed memory systems use hardware implemented virtual addressing schemes to do miss checks at addresses which define coarse-grained page boundaries, for example, 4096 or 8192 bytes.

Different types of data used by a program are most naturally, and efficiently accessed at variable granularities. For example, blocks of data read from and written to bulk sequential addresses of input/output devices are best dealt with in coarse granularities, e.g., 2K, 4k etc. However, many programs also require random access to ranges of addresses which are considerably smaller, e.g., 32, 256, 1024 bytes.

Allowing application programs and data structures to have variable access granularities can improve performance because data can be communicated in the most efficient units of transfer. Data having good spatial locality, e.g., data "clumped" into blocks, can be transported at coarse granularities to amortize the time of long communications latencies. In contrast, data subject to "false sharing" can be communicated at finer granularities.

False sharing is a condition where independent portions of data, for example, array elements, are stored in the data structure, e.g., one or more blocks, and accessed by multiple workstations. Variable sized blocks, eliminates the need to repeatedly transfer large fixed size quantities of data including smaller independent portions of false shared data between the workstations.

Accordingly, the process 300 of FIG. 3 is optimized to process units of data transfer having variable granularities. A unit of data transfer, e.g. a block, can be any integer multiple of lines, depending on the fixed line size chosen for the program, e.g., different programs can access data having different line sizes (32, 64, 128 byte lines).

In order to choose an appropriate block size for any particular data structure, a heuristic based on the allocated size can be used. The basic heuristic chooses a block size equal to the size of the allocated data structure, up to a predetermined threshold size of the data structure, for example, 1K or 2K bytes. For allocated data structures which are larger than the predetermined threshold size, the granularity can simply be the size of a line. The rationale for the heuristic is that small data structures should be transferred as a unit when accessed; larger data structures, such as arrays, should be communicated at fine granularities to avoid false sharing.

The heuristic can be modified by inserting special allocation instructions in the programs which explicitly define the block size. Since the size of allocated blocks does not affect the correctness of the program, the appropriate block size for maximum performance can be determined empirically.

As shown in FIG. 13, the block size 1315 of an allocatable piece of data is maintained by the home workstation in a directory 1300. Each line entry includes the size 1315 of the corresponding block. Workstations become aware of the size of a block when data of the block are transported to a requesting workstation.

Because workstations do not need to know the size of blocks, the sizes can be determined dynamically. For example, a home workstation can change the granularity of an entire data structure by first invalidating all lines which comprise the data structure, and then changing the block sizes in the directory entries 1301.

The home workstation can look up the size of a block when an access request, e.g., read, write, ownership, for data at a target address of a particular line is received. Then, the home workstation can send the correct number of lines comprising the entire block to the requesting workstation. Any other copies of the lines can be appropriately handled by the workstation using the vector 1320. In reply to any access request, other than the initial request, all protocol operations are performed on all lines of the block.

In order to simplify the miss check code, the states of pieces of data are checked and maintained on a per-line basis. However, the protocol 352 ensures that all lines of a block are always in the same state. Therefore, the in-line miss check code can efficiently maintain states for variable sized blocks.

In the case of variable sized granularities, a workstation may not know the size of a block containing a requested line. For example, a workstation requests to access data at address A, and address A+64. In the case where the workstation does not know the size of blocks, it may make two requests assuming a line size of 64 bytes, one for each target address, even if the addresses are in the same block.

However, as an advantage, the protocol as described herein transfers in a single message the entire block containing the lines. Subsequently, the home station processing the initial request can also recognize that the second request is not needed. This is true in all cases, except when another workstation makes a request for access to the first line, before the request for the second line is fully processed. In this case, the second request must be treated as an initial request, since the current states of the data are not always determinable.

Figure 14:
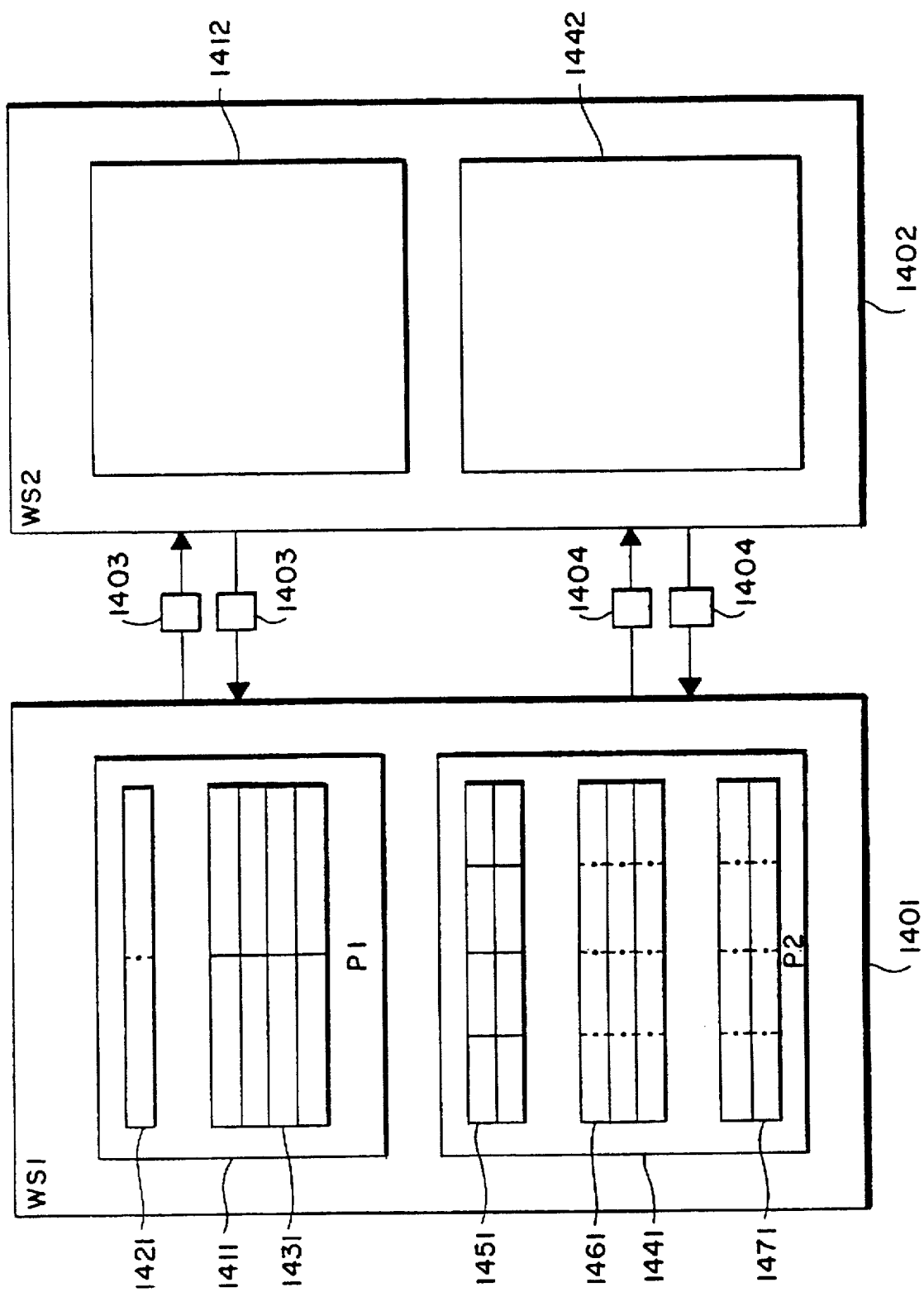
FIG. 14 is a block diagram of data structures of the present invention.

FIG. 14 shows data structures having variable granularities. Memories 1401 are associated with a first workstation (WS1), and memories 1402 are associated with a second workstation (WS2).

Within memories 1401 of the first workstation, a first program (P1) 1411 has allocated data structures to have lines of 64 bytes, and a second program (P2) 1441 has allocated data structures to have lines of 32 bytes.

The first program 1411 includes data structures 1421 and 1431. Data structures 1421 includes 1 block of 128 bytes, e.g., two lines per block. Data structures 1431 has 8 blocks of 64 bytes, e.g., one line per block.

The second program includes data structures 1451, 1461, and 1471. Data structures 1451 include eight blocks of 32 bytes (one line) each. Data structures 1461 includes three blocks of 128 bytes (four lines) each. Data structures 1471 includes one block of 256 bytes, e.g., eight lines.

The memories 1402 of the second workstation include comparable programs 1412 and 1442 and their data structures. As described above, the workstations communicate data in block sized units of transfer. For example, the first programs 1411 and 1412 transfer data using blocks 1403, and the second programs 1441 and 1442 transfer blocks 1404. As an advantage, the blocks 1403 and 1404 can have different sizes, e.g., variable granularities, and different line sizes, e.g., 32 and 64 bytes.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. In a computer system including a plurality of workstations, each workstation including a processor, a memory having addresses, and an input/output interface connected to each other by a bus, the input/output interfaces connecting the workstations to each other by a network, a software implemented method for batching access checks to shared data stored in the memories, comprising the steps of:

designating a set of the addresses of the memories as virtual shared addresses to store shared data;

allocating a portion of the virtual shared addresses to store a shared data structure as one or more lines accessible by instructions of programs executing in any of the processors, the size of each line being a predetermined number of bytes;

analyzing the programs to locate a set of instructions of a particular program which access a range of target addresses storing shared data, the range of target addresses being no greater than the size of one line; and in response to determining that accesses to the shared data stored at a first and last addresses of the range of target addresses are valid, executing the set of instructions.

2. The method of claim 1 further comprising:

executing miss handling code before executing the set of instructions if accesses to the shared data stored at the first or last addresses of the range of target addresses are invalid;

servicing misses on multiple lines simultaneously, to reduce an average latency for fetching data from remote workstations.

3. The method of claim 1 further comprising:

while analyzing, sequentially tracing an executing flow of the particular program to locate the instructions of the set which access the range of target addresses and terminating the sequential tracing upon detecting a subroutine call instruction.

4. The method of claim 1 further comprising:

while analyzing, sequentially tracing an executing flow of the particular program to locate the instructions of the set which access the range of target addresses and terminating the sequential tracing upon detecting a store instruction that occurs in a conditionally executed section of the instructions.

5. The method of claim 1 further comprising:

while analyzing, sequentially tracing an executing flow of the particular program to locate the instructions of the set which access the range of target addresses and terminating the sequential tracing upon detecting a conditional branch instruction that forms a loop.

6. The method of claim 1 further comprising:

while analyzing, sequentially tracing an executing flow of the particular program to locate the instructions of the set which access the range of target addresses and terminating the sequential tracing upon detecting an access outside the range of target addresses.

7. The method of claim 1 further comprising:

while analyzing, sequentially tracing an executing flow of the particular program to locate the instructions of the set which access the range of target addresses and terminating the sequential tracing upon detecting a load or store instruction which use a base register which is modified by a variable to determine target addresses.

8. The method of claim 1 wherein the set of instructions are confined to be from a single basic block of instructions.

9. A method for batch checking access instructions to shared addresses of a memory storing data to be shared by a plurality of processors, comprising the steps of:

analyzing executable programs to locate a set of access instructions of one of said programs for accessing a range of the shared addresses;

determining if access to data stored within the range of shared addresses is valid; and executing said located set of access instructions if said access to the data stored within the range of shared addresses is determined to be valid.

10. The method of claim 9, further comprising the step of:

allocating a portion of said shared addresses to store shared data as at least one line, each of said at least one line having a predetermined number of bytes, said shared data being accessible by access instructions of said executable programs.

11. The method of claim 9, wherein said range of shared addresses include no more than one line of said memory.

12. The method of claim 11, wherein said no more than one line of said memory has a predetermined number of bytes.

13. The method of claim 9, wherein said step of determining includes determining if access to said shared data within a first and a last address of said range of shared addresses is valid.

14. The method of claim 9, further comprising the step of:

executing miss handling code before executing said located set of access instructions if the access is determined to be invalid.

15. The method of claim 14, wherein said step of executing the miss handling code includes:

executing the miss handling code if the access is determined to be invalid for multiple lines of the memory simultaneously.

16. The method of claim 9, wherein said step of analyzing includes:

sequentially tracing an execution flow of said programs to locate said set of access instructions; and terminating said sequential tracing responsive to one of (i) detecting that said set of access instructions includes a subroutine call, (ii) detecting that said set of access instructions includes a store instruction occurring in a conditionally executed section of the one of said programs, (iii) detecting that said set of access instruction includes a conditional branch instruction that forms a loop, (iv) detecting that said set of access instruction includes accesses to memory addresses outside said range of shared addresses, (v) detecting that said set of access instruction includes a load instruction which uses a base register modified by a variable to determine addresses, and (vi) detecting that said at least one access instruction includes a store instruction which uses a base register modified by a variable to determine addresses.

17. A system for checking access instructions to shared addresses of a memory comprising:

at least one memory having a plurality of addresses at which data to be shared by multiple processors is stored; and a first of the multiple processors configured to:
   analyze an executable program to locate access instructions of said program for accessing shared addresses;
   determine if access to said data stored at the addresses is valid; and
   execute said located access instructions if said access is determined to be valid.

18. The system of claim 17, wherein said at least one memory is further configured to allocate a portion of said addresses at which the shared data is stored as at least one line of memory, each of said at least one line having a predetermined number of bytes.

19. The system of claim 17, wherein said addresses include no more than one line of said memory.

20. The system of claim 19, wherein said no more than one line of said memory includes a predetermined number of bytes.

21. The system of claim 17, wherein said processor is further configured to determine if access to said data within a first and a last address of said addresses is valid.

22. The system of claim 17, wherein said processor is further configured to execute miss handling code before executing said located access instructions if the access is determined to be invalid.

23. The system of claim 17, wherein said processor is further configured to execute miss handling code if the access is determined to be invalid for multiple lines of the memory simultaneously.

24. The system of claim 17, wherein said processor is further configured to:

sequentially trace an execution flow of said program to locate said access instructions; and terminate said sequential tracing responsive to one of (i) detecting that said access instructions includes one of a subroutine call, (ii) detecting that said access instructions include a store instruction occurring in a conditionally executed section of one of said programs, (iii) detecting that said access instruction includes a conditional branch instruction that forms a loop, (iv) detecting that said access instruction includes accesses to memory addresses outside said range of target addresses, (v) detecting that said access instruction includes a load instruction which uses a base register modified by a variable to determine target addresses, and (vi) detecting that said at least one access instruction includes a store instruction which uses a base register modified by a variable to determine target addresses.

25. The system of claim 17, further comprising:

a network coupling the multiple processors to the memory.

26. The system of claim 25, wherein:

the at least one memory is a plurality of memories each having addresses at which the data to be shared by the multiple processor is stored and each coupled to said multiple processors by said network.

* * * * *